United States Patent
Grutter et al.

(10) Patent No.: US 10,150,480 B2
(45) Date of Patent: Dec. 11, 2018

(54) VEHICLE ALL-WHEEL DRIVE CONTROL SYSTEM

(71) Applicant: FORD GLOBAL TECHNOLOGIES, LLC, Dearborn, MI (US)

(72) Inventors: Peter John Grutter, Dearborn, MI (US); Nicholas Edward McCubbin, Northville, MI (US); Adam Joseph Krach, Canton, MI (US); Derek Kempton Ward, Duisburg (DE); Alex Fischer, Monheim (DE); Martin Kampe, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/376,071

(22) Filed: Dec. 12, 2016

(65) Prior Publication Data
US 2018/0162398 A1 Jun. 14, 2018

(51) Int. Cl.
| | |
|---|---|
| *B60W 10/02* | (2006.01) |
| *B60W 30/18* | (2012.01) |
| *B60W 10/06* | (2006.01) |
| *B60W 10/119* | (2012.01) |
| *B60W 10/16* | (2012.01) |
| *B60W 30/182* | (2012.01) |
| *B60K 17/02* | (2006.01) |
| *B60K 17/34* | (2006.01) |
| *B60W 10/14* | (2012.01) |
| *F16D 48/06* | (2006.01) |

(52) U.S. Cl.
CPC .......... *B60W 30/182* (2013.01); *B60K 17/02* (2013.01); *B60K 17/34* (2013.01); *B60W 10/02* (2013.01); *B60W 10/14* (2013.01); *F16D 48/06* (2013.01); *B60W 2520/403* (2013.01); *B60W 2720/403* (2013.01); *F16D 2500/10431* (2013.01); *F16D 2500/3065* (2013.01)

(58) Field of Classification Search
CPC ............... B60W 10/06; B60W 10/119; B60W 2520/403; B60W 2710/0666
See application file for complete search history.

(56) References Cited

U.S. PATENT DOCUMENTS

| | | | |
|---|---|---|---|
| 8,396,633 B2 | 3/2013 | Buszek et al. | |
| 9,272,619 B2 | 3/2016 | Quehenberger et al. | |
| 9,623,748 B2 * | 4/2017 | Strasser | B60K 23/08 |
| 9,783,053 B2 * | 10/2017 | Ogawa | B60K 23/08 |

(Continued)

FOREIGN PATENT DOCUMENTS

WO 2014080279 A1 5/2014

*Primary Examiner* — Ramya P Burgess
*Assistant Examiner* — David R Morris
(74) *Attorney, Agent, or Firm* — James Dottavio; Brooks Kushman P.C.

(57) ABSTRACT

A vehicle includes a first axle, second axle, driveshaft, engine, clutch, and controller. The first and second axles are coupled by the driveshaft. The engine is configured to generate torque in the first axle. The clutch is configured to disconnect an output of the second axle. The controller is programmed to, responsive to a clutch release request that would result in an increasing commanded torque to the first axle being greater than a threshold, decrease an engine torque such that a first axle torque is less than the threshold.

20 Claims, 3 Drawing Sheets

(56) References Cited

U.S. PATENT DOCUMENTS

| | | | |
|---|---|---|---|
| 2014/0324290 A1* | 10/2014 | Dornhege | B60T 8/175 |
| | | | 701/41 |
| 2016/0185216 A1 | 6/2016 | Clarke et al. | |
| 2016/0236568 A1* | 8/2016 | Quehenberger | B60K 17/35 |
| 2017/0232958 A1* | 8/2017 | Hata | B60W 20/40 |
| | | | 701/22 |
| 2018/0009432 A1* | 1/2018 | Takagi | B60K 6/365 |
| 2018/0111479 A1* | 4/2018 | Grutter | B60K 17/348 |
| 2018/0141558 A1* | 5/2018 | Grutter | B60K 23/08 |

* cited by examiner

VEHICLE ALL-WHEEL DRIVE CONTROL SYSTEM

TECHNICAL FIELD

The present disclosure relates to control systems for all-wheel drive vehicles.

BACKGROUND

Vehicles may include all-wheel drive systems that are designed to improve vehicle maneuverability and decrease driver discomfort.

SUMMARY

A vehicle includes a first axle, second axle, driveshaft, engine, clutch, and controller. The first and second axles are coupled by the driveshaft. The engine is configured to generate torque in the first axle. The clutch is configured to disconnect an output of the second axle. The controller is programmed to, responsive to a clutch release request that would result in an increasing commanded torque to the first axle being greater than a threshold, decrease an engine torque such that a first axle torque is less than the threshold.

A vehicle includes a first axle, second axle, driveshaft, first clutch, and controller. The first and second axles are coupled by the driveshaft. The first clutch is configured to disconnect an output of the second axle. The controller is programmed to, responsive to a request to release the first clutch that would result in an increasing commanded torque to the first axle being greater than a threshold, decrease a first axle torque to less than the threshold and open the first clutch.

A vehicle includes a first axle, second axle, prime mover, driveshaft, and controller. The first and second axles have first and second differentials, respectively. The prime mover is configured to generate torque in the first axle. The driveshaft is selectively coupled to a carrier of the first differential by a first clutch and fixedly coupled to a carrier of the second differential. A second clutch is configured to decouple a drive wheel from an output of the second differential. The driveshaft is configured to transfer torque from the first axle to the second axle when the first and second clutches are closed. The controller is programmed to, responsive to a command to disconnect the driveshaft that would result in an increasing commanded torque to the first axle being greater than a threshold, decrease a torque of the prime mover such that a torque of the first axle is less than the threshold and open the first and second clutches.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
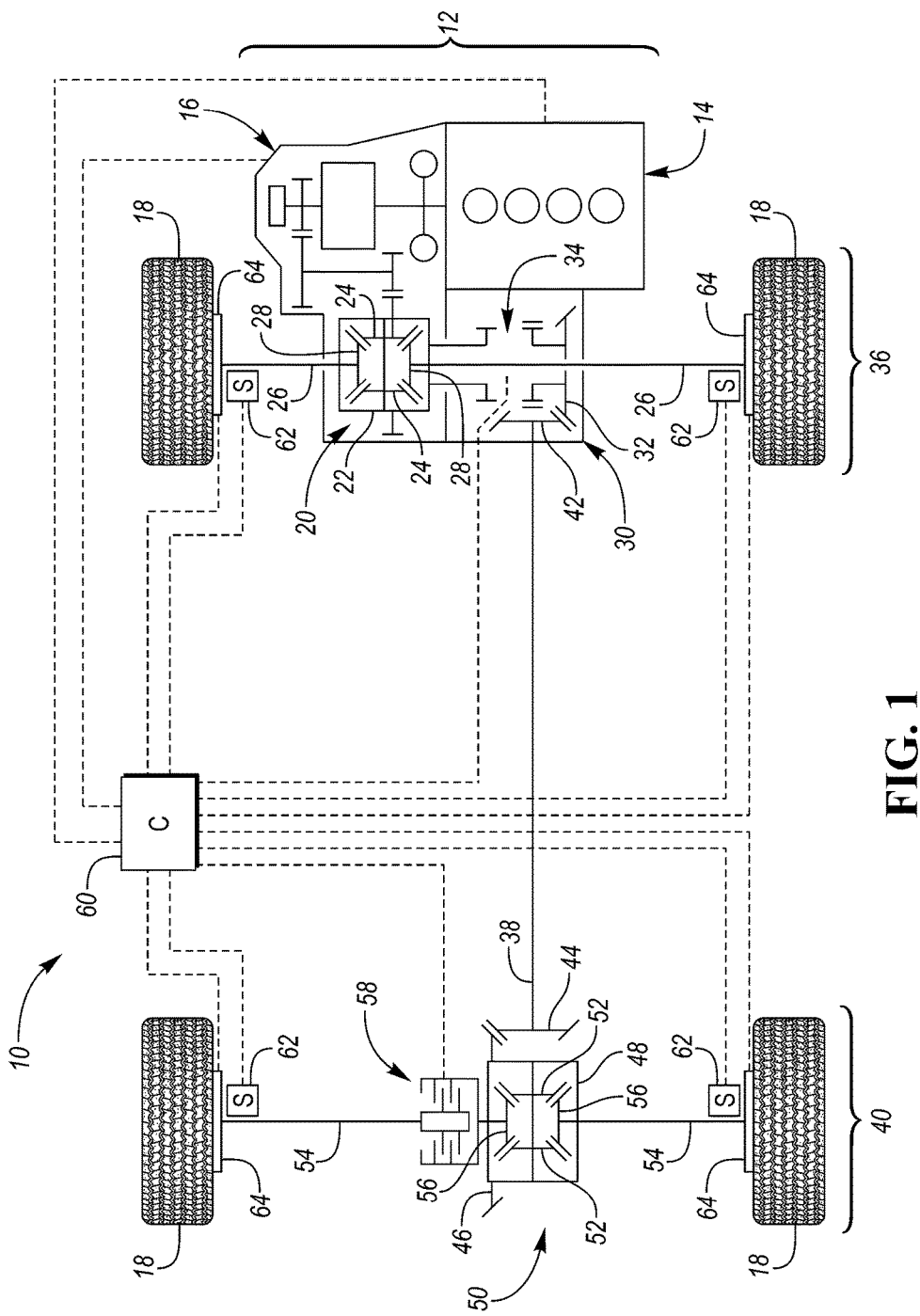
FIG. 1 is a schematic illustration of a representative vehicle and a representative vehicle powertrain.

Referring to FIG. 1, a schematic diagram representative of a vehicle 10 and a vehicle powertrain 12 is illustrated. The vehicle 10 may be an all-wheel-drive (AWD) vehicle where the powertrain 12 is capable of delivering power to all of the vehicle's wheels, whether full-time or on-demand. The powertrain 12 includes prime movers or power generating components (i.e., engines or electric motors) and the drivetrain. The drivetrain is the group of components that deliver power to the drive wheels, excluding the power generating components. In contrast, the powertrain 12 is considered to include both the power generating components and the drivetrain. The powertrain 12 includes an engine 14 and a transmission 16. The powertrain 12 may alternatively, or in addition to the engine 14, include an electric motor as a prime mover. If an electric motor is used as an alternative to the engine 14 it should be construed to perform all the functions of the engine 14 as described herein. The transmission 16 may include gearing arrangements configured to provide multiple gear ratios between an input and an output of the transmission 16. The engine 14 is connected to the input of the transmission 16 while drivetrain components that are configured to deliver power to drive wheels 18 are connected to outputs of the transmission 16. The engine 14 may be connected to the input of the transmission by a torque converter or a launch clutch.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

The transmission 16 may be a transaxle that includes both gearing elements that provide multiple gear ratios between an input and an output of the transmission 16 and a differential, which may be referred to as the front axle differential 20. The front axle differential 20 may comprise the output of the transmission 16. The front axle differential 20 includes a carrier 22, spider (or bevel) gears 24 that are rotatably coupled to the carrier 22, and output (or half) shafts 26 that include bevel gears 28 that mesh with the spider gears 24. The output shafts 26 are each fixedly coupled to a drive wheel 18. The vehicle 10 may also include a power transfer unit (PTU) 30. The PTU 30 may also be referred to as a power takeoff unit. The PTU 30 may include a ring gear 32 that is selectively coupled to the carrier 22 by power transfer unit clutch (PTU clutch) 34. The PTU clutch 34 may be a dog clutch. Collectively, the front axle differential 20 (including the carrier 22, spider gears 24, output shafts 26, bevel gears 28, etc.) and the PTU 30 (including the ring gear 32 and PTU clutch 34) may be referred to as the front axle 36. The front axle 36 may or may not also include the drive wheels 18 that are fixedly coupled to the output shafts 26. The output shafts 26 and the carrier 22 may all act as outputs of the front axle 36. The engine 14 (or other prime mover) may be configured to generate and transfer power and/or torque to the front axle 36.

A driveshaft 38 may be configured to couple the front axle 36 to a rear axle 40. More specifically, the driveshaft 38 may include a first bevel gear 42 that meshes with the ring gear 32 in the PTU 30 and a second bevel gear 44 that meshes with a ring gear 46 that is affixed to a carrier 48 of a rear axle differential 50. The rear axle differential 50 also includes spider (or bevel) gears 52 that are rotatably coupled to the carrier 48, and output (or half) shafts 54 that include bevel gears 56 that mesh with the spider gears 52. The output shafts 54 are each fixedly coupled to a drive wheel 18. One of the half shafts 54 includes a rear drive unit (RDU) clutch 58 that is configured to couple and decouple one of the drive wheels 18 from the rear axle differential 50. Collectively, the rear axle differential 50 (including the ring gear 46, carrier 48, spider gears 52, output shafts 54, bevel gears 56, etc.) and the RDU clutch 58 may be referred to as the rear axle 40. The rear axle 40 may or may not also include the drive wheels 18 that are fixedly coupled to the output shafts 54. Collectively, the rear axle differential 50 (including the ring gear 46, carrier 48, spider gears 52, output shafts 54, bevel gears 56, etc.) and the RDU clutch 58, excluding the drive wheels 18, may be referred to as the rear drive unit (RDU). When the PTU clutch 34 and the RDU clutch 58 are both in closed positions power and/or torque that is generated by the engine 14 is transferred from the front axle 36 to the rear axle 40 via the driveshaft 38.

The front axle 36 may be referred to as the first axle while the rear axle 40 is referred to as the second axle, or vice versa. The front axle differential 20 may be referred to as the first differential while the rear axle differential 50 is referred to as the second differential, or vice versa. The carrier 22, spider gears 24, and bevel gears 28 of the front axle differential 20 may be referred to as the first carrier, first set of spider gears, and first set of bevel gears, respectively, while the carrier 48, spider gears 52, and bevel gears 56 of the rear axle differential 50 may be referred to as the second carrier, second set of spider gears, and second set of bevel gears, respectively, or vice versa. The output (or half) shafts 26 of the front axle differential 20 may be referred to as the first and second output (or half) shafts while the output (or half) shafts 54 of the rear axle differential 50 may be referred to as the third and fourth output (or half) shafts, or vice versa. The RDU clutch 58 may be referred to as the first clutch while the PTU clutch 34 may be referred to as the second clutch, or vice versa.

When the PTU clutch 34 and the RDU clutch 58 are both in open positions such that the ring gear 32 is decoupled from the carrier 22 and one of the drive wheels is decoupled from the rear axle differential 50, parasitic losses within the driveline may be decreased because specific intermediate components will be disconnected from the powertrain 12 and cease rotating. Specifically, when the PTU clutch 34 and the RDU clutch 58 are both in open positions the ring gear 32, driveshaft 38 and carrier 48 of the rear axle differential 50 will all cease to rotate decreasing parasitic losses and increasing the overall fuel economy of the vehicle 10.

The vehicle 10 further includes an associated controller 60 such as a powertrain control unit (PCU). While illustrated as one controller, the controller 60 may be part of a larger control system and may be controlled by various other controllers throughout the vehicle 10, such as a vehicle system controller (VSC). It should therefore be understood that the controller 60 and one or more other controllers can collectively be referred to as a "controller" that controls various actuators in response to signals from various sensors to control functions of various components.

The controller 60 may be configured to receive signals indicative of the wheel speed of each individual drive wheel 18. The controller 60 may receive the signals from speed sensors 62 that are configured to determine the rotational speed of each individual drive wheel 18. The controller 60 may include an algorithm that is configured to convert the rotational speed of each individual drive wheel 18 into linear speed.

The controller 60 may be configured to control the power, torque, and/or speed output of the engine 14 (or other prime movers such as electric motors in electric or hybrid vehicles) based on an accelerator and/or a brake pedal input or any other state or condition that may require an adjustment of the power, torque, and/or speed output of the engine 14 (or other prime mover). The controller 60 may further be configured to control various functions of the transmission 16, such as shifting, based on various inputs including accelerator and/or brake pedal input, a regenerative braking request (in vehicles that include electric generators configured to recharge a battery), other operator inputs (such as changing the position of a transmission gear selector), etc.

The controller 60 may be configured to control friction brakes 64 (or actuators thereof) based on input from the brake pedal or another state or condition of the vehicle 10 that may require breaking. Additionally, the controller 60 may be configured to control the PTU clutch 34 (or actuators thereof) and the RDU clutch 58 (or actuators thereof). Actuators may include electric motors, electric solenoids, valves connected to hydraulic cylinders, valves connected to pneumatic cylinders, or any other actuator known in the art. More specifically, the controller 60 maybe configured to open both the PTU clutch 34 and the RDU clutch 58 based on a need to decrease parasitic losses and increased fuel economy. Alternatively, the controller 60 may be configured to close both the PTU clutch 34 and the RDU clutch 58 based on a need to provide power to the drive wheels 18 of both the front axle 36 and rear axle 40.

The controller 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10.

Control logic or functions performed by the controller 60 may be represented by flow charts, graphs, or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, transmission, transaxle, and/or powertrain controller, such as controller 60. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 60 may be configured to receive various states or conditions of the various vehicle components illustrated in FIG. 1 via electrical signals. The electrical signals may be delivered to the controller 60 from the various components via input channels. Additionally, the electrical signals received from the various components may be indicative of a request or a command to change or alter a state of one or more of the respective components of the vehicle 10. The controller 60 includes output channels that are configured to deliver requests or commands (via electrical signals) to the various vehicle components. The controller 60 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described in FIG. 1 is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The RDU clutch 58 may be utilized to set the amount of powertrain torque that can be transmitted by the rear axle 40 to the drive wheels 18 of the rear axle 40. If the RDU clutch 58, or another mechanism that affects the torque level of the rear axle 40, rapidly reduces the amount of torque that can be transmitted by the rear axle 40, the front axle 36 may rapidly become the sole destination for all of the torque being produced by the powertrain 12. Increasing the torque being routed to the front axle 36 may cause wheel spin (or wheel slip) of the drive wheels 18 on the front axle 36, which may result in loss of lateral traction on of the drive wheels 18 on the front axle 36. If the vehicle 10 is traveling along a curved path the loss of lateral traction of the drive wheels 18 on the front axle 36 may result in understeer. This, in turn, may cause the vehicle 10 to deviate from the curved path intended by the driver.

It should also be understood that the configuration in FIG. 1 could be reversed where the vehicle is primarily driven by the rear axle. For example, the engine 14 (or other prime mover), transmission 16, differential 20, PTU clutch 34, and any other component connected to or part of the front axle in 36 in FIG. 1 could be part of or connected to a rear axle, while the differential 50, an equivalent of the RDU clutch 58, and any other component connected to or part of the rear axle in 40 in FIG. 1 could be part of or connected to a front axle. This alternative reverse configuration may also include the driveshaft 38 that couples the front and rear axles.

In the reversed configuration, the RDU clutch 58 may be utilized to set the amount of powertrain torque that can be transmitted by a front axle to the drive wheels of the front axle. If the RDU clutch 58, or another mechanism that affects the torque level of the front axle, rapidly reduces the amount of torque that can be transmitted by the front axle, a rear axle may rapidly become the sole destination for all of the torque being produced by the powertrain 12. Increasing the torque being routed to a rear axle may cause wheel spin (or wheel slip) of the drive wheels 18 on the rear axle, which may result in loss of lateral traction of the drive wheels 18 on the rear axle. If the vehicle 10 is traveling along a curved path the loss of lateral traction of the drive wheels 18 on the rear axle may result in oversteer. This, in turn, may cause the vehicle 10 to deviate from the curved path intended by the driver.

A rapid reduction in the torque transmitted by the front or rear axle (depending on the configuration) may result from system faults stemming from the mechanical components, electronic hardware, or software of the powertrain 12 or controller 60. The rapid reduction in the torque transmitted by the axle may also be caused if the controller 60 commands a torque reduction to the axle while in an AWD drive mode by reducing the torque capacity of the RDU clutch or if the controller 60 commands the vehicle 10 to exit the AWD mode by opening the PTU clutch 34 and the RDU clutch 58 to disconnect the driveshaft 38 and other intermediate components of the powertrain 12 in order to decrease parasitic losses, as described above.

Figure 2:
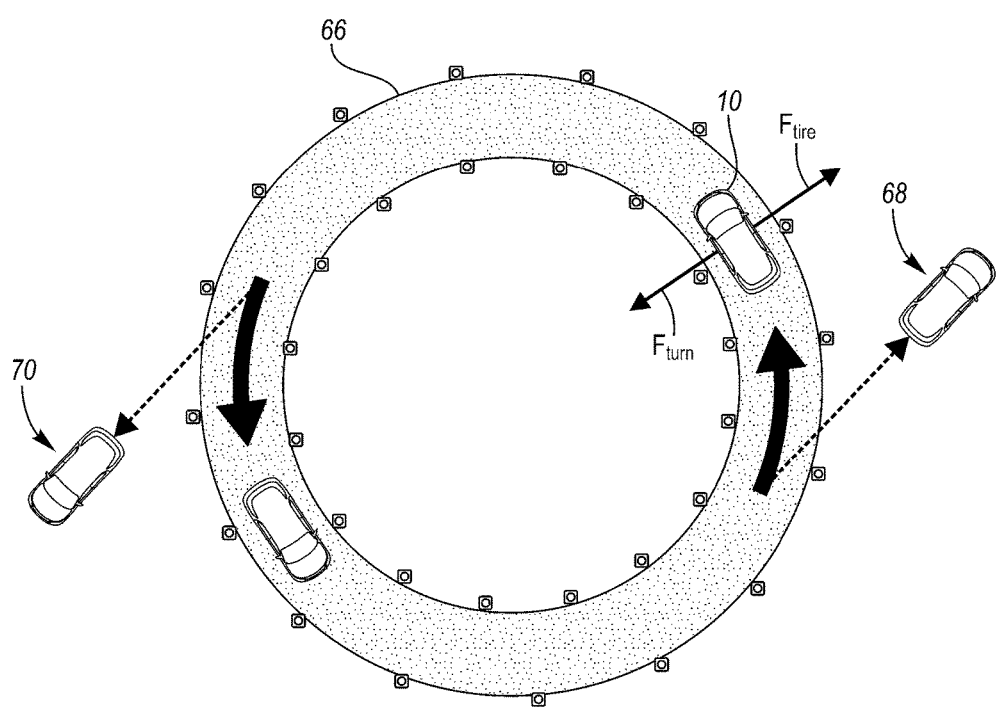
FIG. 2 is an illustration of the vehicle traveling along a curved path.

Referring to FIG. 2, the vehicle 10 traveling along a curved path 66 is illustrated. The vehicle 10 will remain on the desired curved path 66 as long as the amount of lateral force the tire exhibits on the vehicle, $F_{tire}$, is equal and opposite to the force the turn, $F_{turn}$, is exhibiting on the vehicle. Essentially, the lateral force the tire exhibits on the vehicle, $F_{tire}$, is equal to a centrifugal force acting on the vehicle 10 while the force the turn, $F_{turn}$, is exhibiting on the vehicle 10 is equal to a centripetal force acting on the vehicle 10. The force the turn, $F_{turn}$, is exhibiting on the vehicle 10 and the lateral force the tire exhibits on the vehicle, $F_{tire}$, may be functions of lateral acceleration of the vehicle, speed of the vehicle, tire adhesion to the surface the tire is traveling over, and the torque being applied at the wheels. A vehicle experiencing an understeering condition 68 is shown to deviate from the curved path 66 due to the rapid transfer of torque to the front axle causing slip in the front wheels resulting in a differential between the lateral force the tire exhibits on the vehicle, $F_{tire}$, and the force the turn, $F_{turn}$, is exhibiting on the vehicle. A vehicle experiencing an oversteering condition 70 is shown to deviate from the curved path 66 due to the rapid transfer of torque to rear axle causing slip in the rear wheels resulting in a differential between the lateral force the tire exhibits on the vehicle, $F_{tire}$, and the force the turn, $F_{turn}$, is exhibiting on the vehicle.

Figure 3:
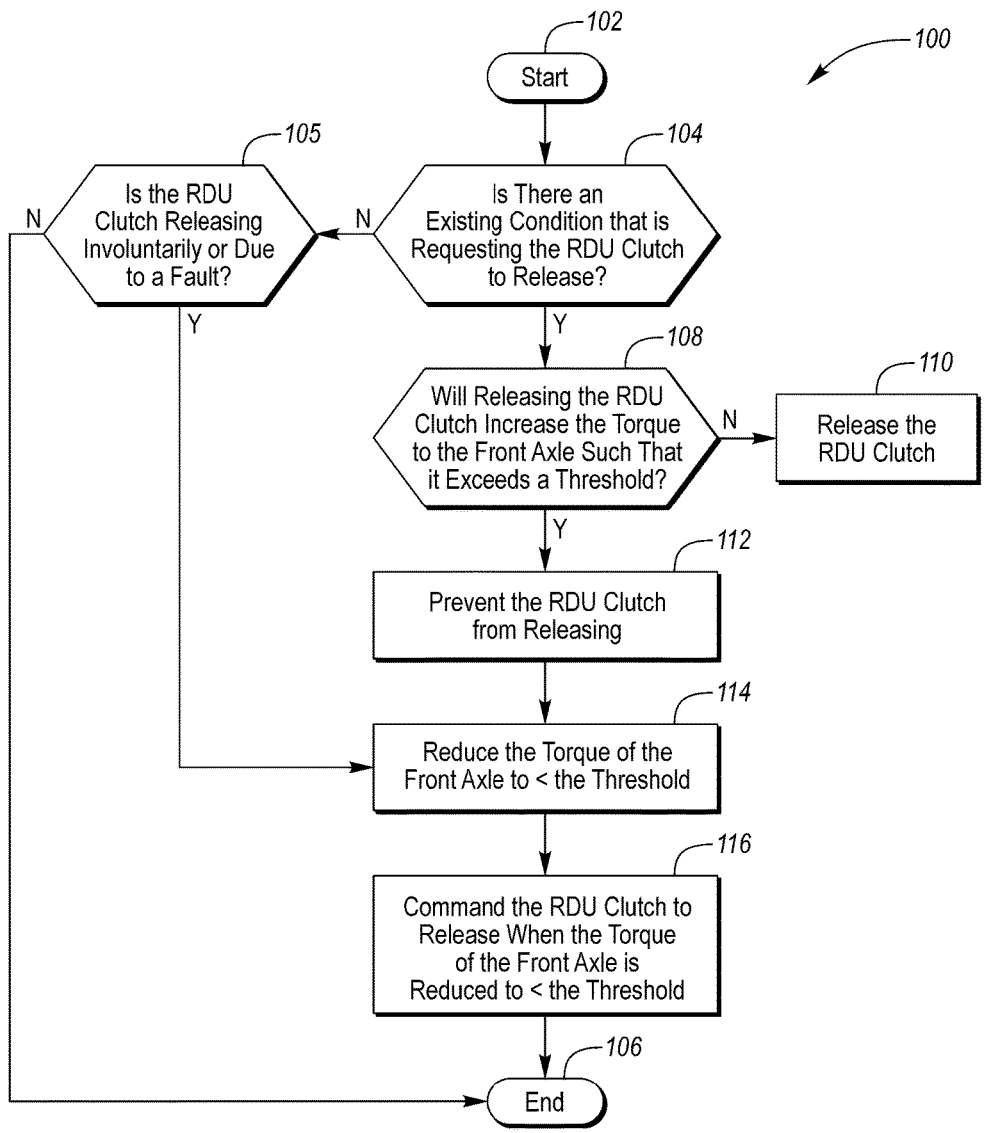
FIG. 3 is a flowchart illustrating a method of controlling the powertrain of the vehicle.

Referring to FIG. 3 a flowchart of a method 100 of controlling the powertrain 12 of the vehicle 10 is illustrated. The method 100 may be stored as an algorithm and/or control logic within the controller 60. The controller 60 may be configured to implement the method 100 by sending electrical signals to various components (or actuators thereof) of the vehicle 10 via output channels in response to receiving electrical signals from various components of the vehicle 10 via input channels.

The method 100 is initiated at start block 102. The method 100 may be initiated when the vehicle 10 is transitioned into an AWD mode where the PTU clutch 34 is closed and the RDU clutch 58 is controlled to adjust the torque transferred from the front axle 36 to the rear axle 40 via the driveshaft 38. Once initiated, the method 100 moves on to decision block 104 where it is determined if there is an existing condition that is requesting the RDU clutch 58 to release that will result in an increasing commanded torque to the front axle 36. A release of the RDU clutch 58 may refer to decreasing the actuation force on the RDU clutch 58 such that the torque capacity of the RDU clutch 58 is reduced or fully opening the RDU clutch 58 such that zero torque flows from the front axle 36 to the rear axle 40 via the driveshaft 38. Adjusting (either increasing or reducing) the torque capacity of the RDU clutch 58 may be commanded by the controller 60 when the vehicle 10 is in the AWD mode to ensure that torque is properly distributed among the drive wheels 18 of the vehicle 10. Proper distribution of torque among the drive wheels 18 may require increasing torque to specific drive wheels 18 while at the same time decreasing torque to other drive wheels 18 to prevent wheel slip and/or increase traction at one or more specific drive wheels 18. Fully opening the RDU clutch 58, such that zero torque flows from the front axle 36 to the rear axle 40 via the driveshaft 38, may be commanded by the controller 60 when it is desirable to exit the AWD mode. Exiting the AWD mode may also require opening the PTU clutch 34 in order to reduce parasitic losses by disconnecting specific intermediate components, including the driveshaft 38, from the powertrain 12 as described above.

If it is determined at decision block 104 that there is not an existing condition that is requesting the RDU clutch 58 to release that will result in an increasing commanded torque to the front axle 36, the method 100 moves on to decision block 105 where it is determined if the RDU clutch 58 is releasing involuntarily or due to a system fault. A system fault may trigger a default opened position of the RDU clutch 58. Releasing the RDU clutch 58, whether reducing the torque capacity for fully opening the RDU clutch 58, may result from system faults stemming from the mechanical components, electronic hardware, or software of the powertrain 12 or controller 60. If it is determined at decision block 105 that the RDU clutch 58 is not releasing involuntarily or due to a system fault, the method 100 ends at block 106. Returning to decision block 104, if it is determined that there is an existing condition that is requesting the RDU clutch 58 to release that will result in an increasing commanded torque to the front axle 36 the method 100 moves on to decision block 108 where it is determined if releasing the RDU clutch 58 will increase the torque to the front axle 36 such that the torque of the front axle 36 exceeds (or is greater than) a threshold. The threshold may correspond to a torque value above which will result in a lateral slipping condition in the drive wheels 18 of the front axle 36. More specifically, the threshold may correspond to a torque value above which will result in a lateral slipping condition in the drive wheels 18 of the front axle 36 during a turning maneuver of the vehicle 10. If releasing the RDU clutch 58 will not increase the torque to the front axle 36 such that the torque of the front axle 36 is greater than the threshold, the method 100 moves on to block 110 where the RDU clutch 58 is released. The PTU clutch 34 may also be released at block 110 if the vehicle 10 is exiting the AWD mode in order to reduce parasitic losses by disconnecting the specific intermediate components, including the driveshaft 38, of the powertrain 12.

If releasing the RDU clutch 58 will increase the torque to the front axle 36 such that the torque of the front axle 36 is greater than the threshold, the method 100 moves on to block 112 where the RDU clutch 58 is prevented from releasing. The method 100 will then move on to block 114 where the torque commanded to the front axle 36 is reduced to a value that is less than the threshold. The torque commanded to the front axle 36 may be reduced by reducing the torque applied to the front axle 36 by the engine 14 or other prime mover. Once the torque commanded to the front axle 36 is reduced to a value that is less than the threshold, the method 100 moves on to block 116 where the RDU clutch 58 is commanded to release. The PTU clutch 34 may also be released at block 116 if the vehicle 10 is exiting the AWD mode in order to reduce parasitic losses by disconnecting the specific intermediate components, including the driveshaft 38, of the powertrain 12. Once the RDU clutch 58 is released at block 116 the method 100 ends at block 106.

Returning to decision block 105, if it is determined that the RDU clutch 58 is releasing involuntarily or due to a system fault, the method moves on to block 114 where the torque commanded to the front axle 36 is reduced to a value that is less than the threshold determined in decision block 108. The method 100 may then skip step at block 116 and end at block 106. Alternatively, the method 100 may complete the step of commanding the RDU clutch 58 to release at block 116 (even though it has already been involuntarily released) before ending at block 106, so that the controller 60 properly flags the current condition of the RDU clutch 58 while subsequently issuing additional control commands to various vehicle systems.

It should be understood that the method 100 may also be applied to the reverse configuration described above. In the reverse configuration, releasing the RDU clutch 58 will increase the commanded torque to the rear axle as opposed to the front axle. Therefore, in the reverse configuration, the torque of the rear axle will be controlled according to the method in order to properly time when to release the RDU clutch 58, and the PTU clutch 34 if the vehicle 10 is exiting the AWD mode, according to the method 100.

It should be understood that the flowchart in FIG. 3 is for illustrative purposes only and that the method 100 should not be construed as limited to the flowchart in FIG. 3. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   first and second axles coupled by a driveshaft;
   an engine configured to generate torque in the first axle;
   a clutch configured to disconnect an output of the second axle; and
   a controller programmed to, responsive to a clutch release request that would result in an increasing commanded torque to the first axle being greater than a threshold, decrease an engine torque such that a first axle torque is less than the threshold.

2. The vehicle of claim 1, wherein the controller is further programmed to, responsive to the clutch release request that would result in the increasing commanded torque to the first axle being greater than the threshold, command the clutch to remain closed until the engine torque is reduced such that the first axle torque is less than the threshold.

3. The vehicle of claim 2, wherein the controller is further programmed to, in response to the engine torque being reduced such that the first axle torque is less than the threshold, open the clutch.

4. The vehicle of claim 3 further comprising a dog clutch configured to disconnect the first axle form the driveshaft and wherein the controller is further programmed to, in response to the engine torque being reduced such that the first axle torque is less than the threshold, open the dog clutch.

5. The vehicle of claim 2, further comprising drive wheels secured to outputs of the first axle and wherein the threshold corresponds to a torque value above which will result in a lateral slipping condition in the drive wheels during a turning maneuver.

6. The vehicle of claim 2, wherein the clutch release request corresponds to a command to exit an all-wheel drive mode.

7. The vehicle of claim 2, wherein the clutch release request corresponds to a reduced torque command to the second axle.

8. The vehicle of claim 1, wherein the clutch release request corresponds to a system fault that triggers a default opened position of the clutch.

9. A vehicle comprising:
   first and second axles coupled by a driveshaft;
   a first clutch configured to disconnect an output of the second axle; and
   a controller programmed to, responsive to a request to release the first clutch that would result in an increasing commanded torque to the first axle being greater than a threshold, decrease a first axle torque to less than the threshold and open the first clutch.

10. The vehicle of claim 9 further comprising a prime mover configured to generate torque in the first axle and wherein the first axle torque is decreased to less than the threshold by decreasing the prime mover torque.

11. The vehicle of claim 10, wherein the controller is further programmed to, responsive to the request to release the first clutch that would result in the increasing commanded torque to the first axle being greater than the threshold, command the first clutch to remain closed until the prime mover torque is reduced such that the first axle torque is less than the threshold.

12. The vehicle of claim 11, further comprising drive wheels secured to outputs of the first axle and wherein the threshold corresponds to a torque value above which will result in a lateral slipping condition in the drive wheels during a turning maneuver.

13. The vehicle of claim 12, wherein the request to release the first clutch corresponds to a command to exit an all-wheel drive mode.

14. The vehicle of claim 9, wherein the request to release the first clutch corresponds to a system fault that triggers a default opened position of the first clutch.

15. The vehicle of claim 9 further comprising a second clutch configured to disconnect the first axle form the driveshaft and wherein the controller is further programmed to, in response decreasing the first axle torque to less than the threshold, open the second clutch.

16. A vehicle comprising:
   first and second axles having first and second differentials, respectively;
   a prime mover configured to generate torque in the first axle;
   a driveshaft selectively coupled to a carrier of the first differential by a first clutch and fixedly coupled to a carrier of the second differential;
   a second clutch configured to decouple a drive wheel from an output of the second differential, wherein the driveshaft is configured to transfer torque from the first axle to the second axle when the first and second clutches are closed; and
   a controller programmed to, responsive to a command to disconnect the driveshaft that would result in an increasing commanded torque to the first axle being greater than a threshold, decrease a torque of the prime mover such that a torque of the first axle is less than the threshold and open the first and second clutches.

17. The vehicle of claim 16, wherein the controller is further programmed to, responsive to the command to disconnect the driveshaft that would result in the increasing commanded torque to the first axle being greater than the threshold, command the first and second clutches to remain closed until the torque of the prime mover is reduced such that the torque of the first axle is less than the threshold.

18. The vehicle of claim 16, further comprising drive wheels secured to outputs of the first axle and wherein the threshold corresponds to a torque value above which will result in a lateral slipping condition in the drive wheels during a turning maneuver.

19. The vehicle of claim 16, wherein the command to disconnect the driveshaft corresponds to a system fault that triggers a default opened position of the first and second clutches.

20. The vehicle of claim 16, wherein the command to disconnect the driveshaft corresponds to a command to exit an all-wheel drive mode.

* * * * *